US005467900A

United States Patent [19]

Maas et al.

[11] Patent Number: 5,467,900

[45] Date of Patent: Nov. 21, 1995

[54] PRECOMPRESSION VALVE FOR TRIGGER SPRAYER

[75] Inventors: Wilhelmus J. J. Maas; Petrus L. W. Hurkmans, both of Someren, Netherlands

[73] Assignee: AFA Products, Inc., Forest City, N.C.

[21] Appl. No.: 214,950

[22] Filed: Mar. 16, 1994

[51] Int. Cl.$^{6}$ .................................................... G01F 11/36

[52] U.S. Cl. ...................... 222/341; 222/380; 222/383.3; 239/333

[58] Field of Search ................................... 222/321, 340, 222/341, 380, 383; 239/333

[56] References Cited

U.S. PATENT DOCUMENTS

| | | | |
|---|---|---|---|
| Re. 33,235 | 6/1990 | Corsette | 222/383 |
| 3,768,734 | 10/1973 | Anderson, Jr. et al. | 222/383 X |
| 4,046,292 | 9/1977 | Corsette | 222/383 |
| 4,191,313 | 3/1980 | Blake et al. | 222/335 |
| 4,225,060 | 9/1980 | Kutik et al. | 222/189 |
| 4,606,480 | 8/1986 | Gazulla | 222/341 |
| 4,618,077 | 10/1986 | Corsette | 222/383 |
| 4,669,664 | 6/1987 | Garneau | 222/333 |
| 4,728,009 | 3/1988 | Schmidt | 222/321 |
| 4,872,596 | 10/1989 | Corsette | 222/383 X |
| 4,958,754 | 9/1990 | Dennis | 222/383 |
| 5,299,717 | 4/1994 | Geier | 222/340 |
| 5,318,206 | 6/1994 | Maas et al. | 222/383 |

FOREIGN PATENT DOCUMENTS

| | | | |
|---|---|---|---|
| 2901038 | 8/1979 | Germany | 239/333 |
| 2143286 | 2/1985 | United Kingdom | 239/333 |
| 8502562 | 6/1985 | WIPO . | |

*Primary Examiner*—Andres Kashnikow
*Assistant Examiner*—Joseph A. Kaufman
*Attorney, Agent, or Firm*—Thomas R. Vigil

[57] ABSTRACT

The trigger sprayer comprises: a body having a cylinder therein; a liquid inlet in communication with the cylinder; an outlet waterway in communication with the cylinder; an outlet nozzle which has an outlet orifice and which is movable to and from a position in communication with the waterway; a piston having an inner and an outer end and being received in said cylinder and being movable between an outer at rest position and an inner pumping stroke position during the pumping strokes of the piston in the cylinder; a trigger operatively coupled to the body and acting on the outer end of the piston; a precompression valve in the cylinder, the valve being operable to allow liquid in the cylinder to enter the waterway only after a predetermined pressure is established in the cylinder and to stop liquid from entering the waterway when the pressure in the cylinder falls below the predetermined pressure; and, biasing structure for biasing the piston away from the valve.

38 Claims, 13 Drawing Sheets

STANDARD SPRAYER

PRECOMPRESSION SPRAYER

PRECOMPRESSION VALVE FOR TRIGGER SPRAYER

BACKGROUND OF THE INVENTION

1. Field of the Invention

The field of the invention relates to trigger sprayers of the type wherein structure is provided for preventing pressurized liquid from being expelled from an outlet orifice in a nozzle of a trigger sprayer until a predetermined pressure of the liquid is reached in a pumping cylinder and the ejection of liquid in a SPRAY, a STREAM or a FOAM is stopped or cut off when the pressure of the liquid being pumped by the trigger sprayer in the pumping cylinder falls below a predetermined pressure.

More specifically, the invention relates to a precompresssiôn valve in a pumping cylinder of a trigger sprayer which only allows pressurized liquid to be expelled when the pressure of the liquid in the pumping cylinder is above a certain predetermined level.

2. Description of the Related Art Including Information disclosed under 37 C.F.R. 21211,97-1.99

Heretofore various trigger sprayer arrangements have been proposed for ejecting, expelling or dispensing liquid under pressure from a liquid dispenser only when the liquid being dispensed is at a predetermined pressure.

Also, structure has been proposed for minimizing the volume of the passageway through which the liquid to be ejected travels before it is ejected from an outlet orifice of the sprayer.

Examples of previously proposed liquid dispensing structures, including trigger sprayers and non-analogous pump type sprayers, for maintaining the liquid being expelled in a STREAM, a SPRAY or a FOAM at or above a certain pressure level are disclosed in the following U.S. patents:

| U.S. Pat. Nos. | Patentee |
|---|---|
| 4,046,292 | Corsette |
| 4,191,313 | Blake et al. |
| 4,225,060 | Kutik et al. |
| 4,260,079 | Cary et al. |
| 4,606,480 | Rodriguez Gazulla |
| 4,618,077 | Corsette |
| Re. 33,235 | Corsette |
| 4,669,664 | Garneau |
| 4,728,009 | Schmidt |

The non-analogous Corsette U.S. Pat. No. 4,046,292 discloses a dispensing pump in which an outlet valve will remain open only when the pumping pressure established by a pump piston is maintained above a predetermined minimum. A pump cylinder in which the pump piston reciprocates vertically comprises a unitary part of the outlet valve and also communicates freely with an expansible and contractible pressure accumulation chamber defined in part by the outlet valve and in part by the stationary pump housing. The pump piston depends from a vertically movable plunger into a cylinder formed in the outlet valve member. The piston and the outlet valve member are moved independently of each other while a stationary outlet for the finger actuated pump is placed in communication with the pressure accumulation chamber which includes the cylinder only when the pressure within that chamber is at or above the predetermined minimum pressure.

The Blake et al. U.S. Pat. No. 4,191,313 also utilizes an accumulation chamber and discloses a trigger operated dispenser comprising a plurality of chambers with movable members therein. An accumulating chamber is separated by a wall from a pump cylinder chamber in which is received a piston. A tapered opening is formed in this wall and a conically-shaped diaphragm-like end wall is integrally formed with a valving element that includes a conical tip which has a tapered end portion at the end of a valve pintle integral with the diaphragm-like end wall. During a pumping stroke of the piston, when it is moved inwardly into the cylinder, pressure builds up in the pumping cylinder until it overcomes the force of the diaphragm-like end wall and forces the tapered end portion or popper type valve away from the tapered opening to open the valve to allow pressurized liquid to enter the accumulation chamber. The liquid that flows through the valve port into the accumulation chamber acts against a free floating piston therein which then moves rearwardly against the bias of a spring element to accumulate an amount of material therein under pressure. Simultaneously, the pressured material flows through a port to a nozzle of the sprayer for discharge.

The non-analogous Kutik et al. U.S. Pat. No. 4,225,060 discloses a continuous pumping system in which a storage compartment formed in the upper end of a hollow piston by a spring loaded accumulation piston and cylinder assembly in the hollow piston in a vertical pumping assembly includes an accumulator spring which stays at a relatively constant length when pumping product to keep a relatively constant pressure on the product to maintain a steady stream of product emerging from the pumping system. Here, a pivotable lever arm is moved inwardly against an annular flange on the hollow piston which has a spring acting between a stationary container cap and the annular flange. As this hollow stem or piston moves downwardly, liquid is forced upwardly into the hollow piston. At the same time, the accumulator piston and accumulator spring that are received in the upper portion of the hollow piston maintain pressure on the liquid now permitted to escape through an outlet orifice connected to an upper portion of the hollow piston.

The Rodriguez Gazulla U.S. Pat. No. 4,606,480 discloses a trigger sprayer wherein a pumping mechanism is moved vertically upwardly when the trigger is depressed to compress liquid in a pump chamber which has a side port opening which is closed by a tapered end of a stem (poppet type valve) in an outlet waterway or conduit which has a spring therein acting against the stem to force the tapered end thereof against a tapered end of the opening. Thus, liquid cannot escape from the pumping chamber until a predetermined pressure is reached for moving the popper type valve at the end of the stem against a spring. The stem fills up a substantial volume of the conduit thereby minimizing the volume through which the pressure liquid must travel to reach an outlet nozzle of the sprayer.

In Cary et al., U.S. Pat. No. 4,260,079 there is disclosed a manually operated dispensing device which includes a bellows, a valve which is located at the inner end of the bellows in each of three embodiments, which is formed by a flexible wall of the bellows at an inner end thereof and which, as the bellows is compressed upon the squeezing of a trigger to create a higher pressure of liquid in the bellows, is caused to deflect or open to allow liquid to pass by the valve into a discharge conduit leading to an outlet orifice in a nozzle cap.

The Corsette U.S. Pat. No. 4,618,077 and the Corsette Reissue Patent U.S. Pat. No. Re. 33,235 disclose a trigger sprayer that includes a thimble-shaped valving element containing inlet and outlet valves and located within a cylindrical portion of a body of the sprayer. A pressure accumulation chamber is defined between the pump body and the valving element at the rear end of the cylinder. A pump piston is received in the thimble-shaped valving element and on an inward stroke thereof compresses liquid within the valving element until liquid entering into an area between the valving element and a back surface of the open cylindrical portion of the pump body builds up enough force to force the valving element acting against a spring positioned between the outer end of the valving element and the outer end of the piston, forward to allow liquid to pass behind the valving element to an outlet waterway.

The Garneau U.S. Pat. No. 4,669,664 teaches a conically shaped skirt valve member that includes a conical skirt on an elongate stem such that the stem reduces part of the volume through which the liquid being ejected must pass to reach an outlet orifice in an outlet nozzle.

The Schmidt U.S. Pat. No. 4,728,009 discloses a trigger sprayer having in an outlet waterway thereof an elongate member which reduces the volume of the outlet waterway passage through which liquid being pumped must pass before engaging a conical skirt-like umbrella valve which is deflected to allow pressurized liquid to pass therearound to reach an outlet orifice.

SUMMARY OF THE INVENTION

According to the present invention there is provided a trigger sprayer comprising: a body having a cylinder therein; a liquid inlet in communication with the cylinder; an outlet waterway in communication with the cylinder; an outlet nozzle including a nozzle which has an outlet orifice and which is movable to and from a position in communication with the waterway; a piston having an inner end and an outer end and being received in the cylinder; a trigger operatively coupled to the body and acting on the outer end of the piston; a precompression valve in a fluid path between the piston and the outlet orifice; the precompression valve being operable to allow liquid in a first part of the fluid path to reach the outlet orifice only after a predetermined pressure is established in the cylinder and to stop liquid from reaching the outlet orifice when the pressure in the cylinder falls below the predetermined pressure; the precompression valve comprising a valve body in the fluid path and having a passage structure, including a space, communicating between the piston and the outlet orifice, and comprising a spring valve element in the space whereby, when pressure is built up in the passage structure upon movement of the piston into the cylinder, the spring valve element is caused to flex allowing liquid under pressure to escape past the spring valve element into a second part of the fluid path and out the outlet orifice in the nozzle; and, a biasing structure for biasing the piston away from the precompression valve.

Also according to the invention there is provided a trigger sprayer comprising: a body having a cylinder therein; a liquid inlet structure in communication with the cylinder; an outlet waterway in communication with the cylinder; an outlet nozzle including a nozzle which has an outlet orifice and which is movable to and from a position in communication with the outlet waterway; a piston having an inner end and an outer end and being received in the cylinder; a fluid path including at least a part of the cylinder and the waterway and extending between the piston and the outlet orifice; a trigger operatively coupled to the body and acting on the outer end of the piston; a precompression valve in the fluid path between the piston and the outlet orifice; the precompression valve being operable to allow liquid in a first part of the fluid path to reach the outlet orifice only after a predetermined pressure is established in the cylinder and to stop liquid from reaching the outlet orifice when the pressure in the cylinder falls below the predetermined pressure; the precompression valve comprising a valve seat in the fluid path, a spring valve element in the fluid path and a retaining structure in the fluid path for retaining the spring valve element against the valve seat, whereby, when pressure is built up in the first part of the fluid path upon movement of the piston into the cylinder, the spring valve element is caused to flex allowing liquid under pressure to escape past the spring valve element into a second part of the fluid path and out the outlet orifice in the nozzle; and, a biasing structure for biasing the piston away from the precompression valve.

DESCRIPTION OF THE PREFERRED EMBODIMENT(S)

Figure 1:
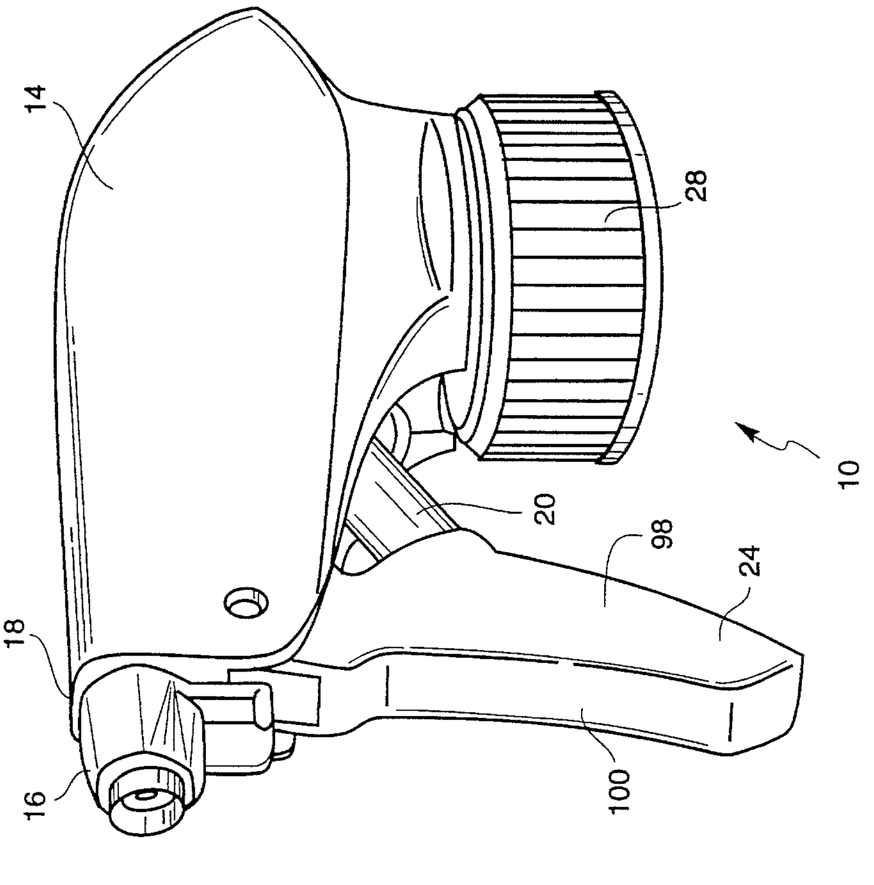
FIG. 1 is a perspective view of a trigger sprayer having mounted therein the precompression valve assembly of the present invention.

Referring now to the drawings in greater detail, there is illustrated in FIG. 1 a trigger sprayer 10 which has a precompression valve assembly 12 (FIG. 2) therein constructed in accordance with the teachings of the present invention. As shown, the sprayer includes a body 14 having a nozzle 16 mounted on a forward end 18 thereof. A piston 20 is received in a pumping cylinder 22 (FIG. 2) in the body 14 and a trigger 24, which is pivotally mounted to the body 14 and which acts against an outer end 26 of the piston 20.

Also shown in FIG. 1 is a bottle cap 28 for connecting the sprayer body 14 to a bottle neck of a container.

Figure 2:
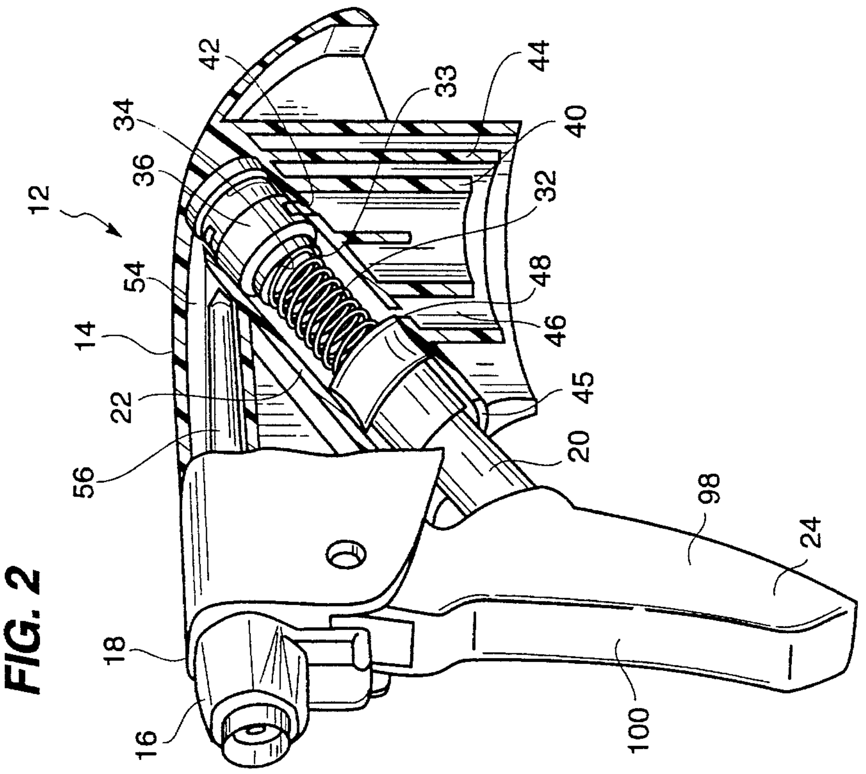
FIG. 2 is a perspective view similar to FIG. 1 but with a portion of the trigger sprayer body cut away to show a pumping cylinder in the body and a precompression valve assembly in the cylinder.

In FIG. 2 there is illustrated the piston 20 received in the cylinder 22 and having an inner end 30 thereof acting against a spring 32 which, in turn, is seated at its inner end 33 against a forward or outer end 34 of a generally cylindrical valve body 36 of a precompression valve assembly 12 constructed according to the teachings of the present invention.

A central liquid intake cylinder 40 extends downwardly from the sprayer body 14 and forms a liquid intake portion 40 of the sprayer body 14. The pumping cylinder 22 extends upwardly at an angle into the sprayer body 14. A liquid inlet port 42 in the wall of the body communicates the pumping cylinder 22 with the interior of the intake cylinder 40 in an area below the precompression valve body 36. Also there is provided an outer cylindrical structure 44 surrounding the intake cylinder 40 and defining an annular chamber or space 46 between the intake cylinder 40 and the cylindrical structure 44. Then, near a lower, open, outer end 45 of the pumping cylinder 22, there is a vent port 48 in the wall of the pumping cylinder 22 that communicates the pumping cylinder 22 to the annular chamber 46.

Near an upper end 50 of the pumping cylinder 22, there is an outlet port 52 just above the valve body 3 6 which communicates with a waterway 54 in an upper part of the sprayer body 14 and in which there is received a filler member 56.

Figure 3:
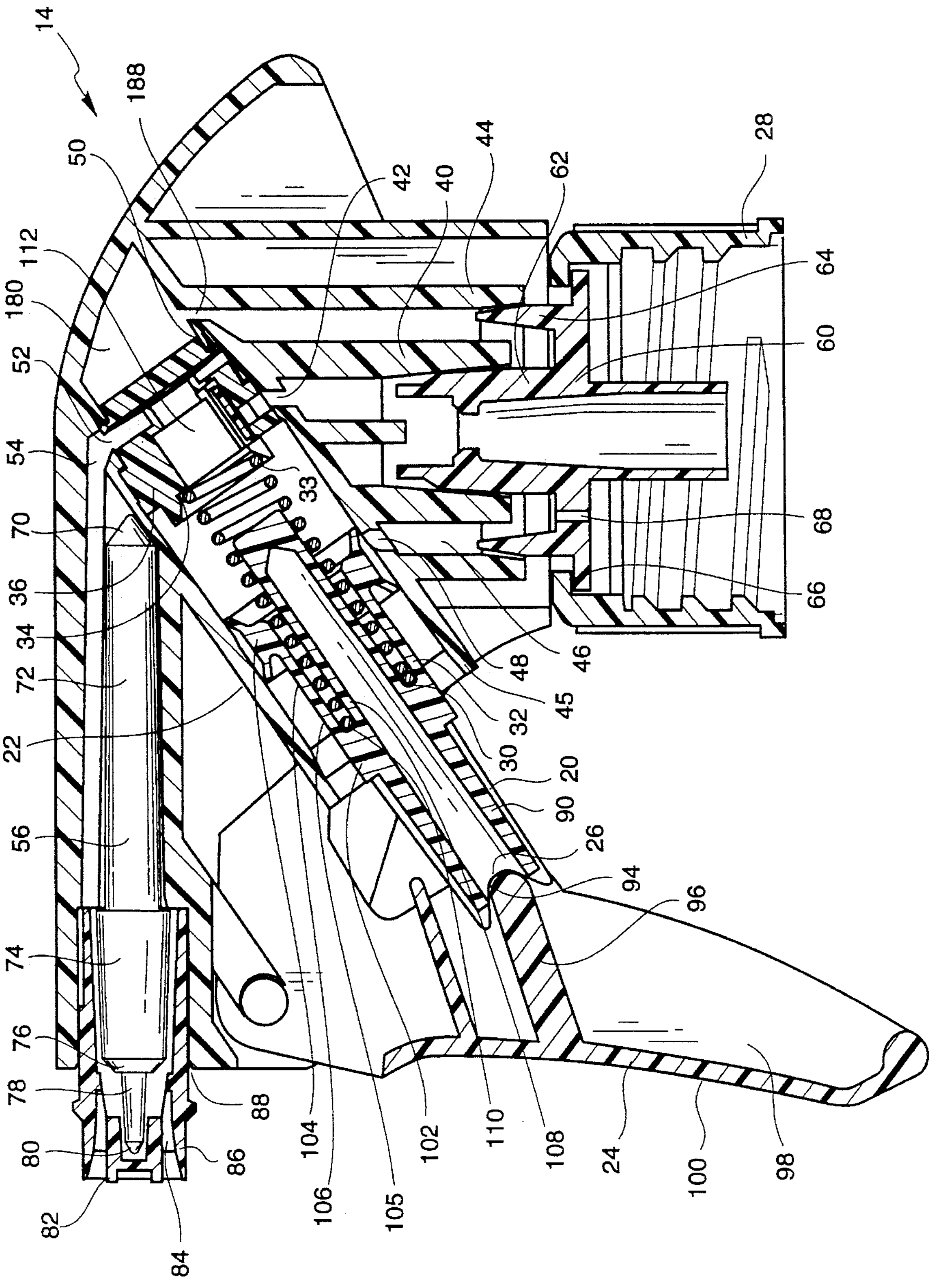
FIG. 3 is a vertical sectional view through the trigger sprayer shown in FIG. 1 showing the precompression valve constructed according to the teachings of the present invention.

As shown in FIG. 3, an insert member 60 extends upwardly from within the bottle cap 28 and has two coaxial cylinders 62 and 64, one cylinder 64 that is received into the annular chamber 46 and the other cylinder 62 which is received into the intake cylinder 40. The insert member 60 also has a disc portion 66 having a vent port 68 therethrough that communicates with the annular chamber 46. The cylinders 62 and 64 of the insert member 60 are spin welded or solvent welded or snap fitted to the intake cylinder 40 and to the cylindrical structure 44, respectively.

Also as shown in FIG. 3, the filler member 56 is generally cylindrical and has a tapered rear end 70, a cylindrical body 72, a forward, larger diameter portion 74 which extends to a conical shoulder 76 which extends forwardly to a pin 78 which ends in a conical point 80 that is received within a nose bushing 82 which is received in an inner cavity 84 within a nose bushing 86 mounted in a counter sunk front opening 88 of the waterway 54 in the sprayer body 14.

As shown in FIG. 3 the piston 20 has an elongate body 90 and a concave rounded outer end 26 which bears against a rounded end 94 of a webbing 96 which is integral with and extends between side walls 98 and rearwardly from a front wall 100 of the trigger 24. The interior of the elongate piston body 90 has an elongate cavity opening onto the outer end 26 as shown. The body 90 extends rearwardly to a slightly larger diameter portion 102 that extends rearwardly to a dual lip sealing formation 104. Then the rear end 105 of the piston body 90 has an axially extending annular groove 106 therein defining a generally cylindrical end portion 108 that extends rearwardly beyond the dual lip sealing formation 104. Annular groove 106 receives an outer end 110 of the spring 32.

As shown, the valve body 36 of the precompression valve assembly 12 has a central axially extending opening 112 therein in which the proximal cylindrical end portion 108 of the piston 20 is received.

With reference to FIGS. 4–14, the precompression valve assembly includes three major components, they being the valve body 36, an inlet, plate or flap valve 114 and a shallow dome shaped spring valve element 116 which is made of a spring material, such as stainless spring steel, or of a stiff but resilient plastic material such as polyethylene, polypropylene or polyacetal or other plastic material or composites thereof.

Figure 4:
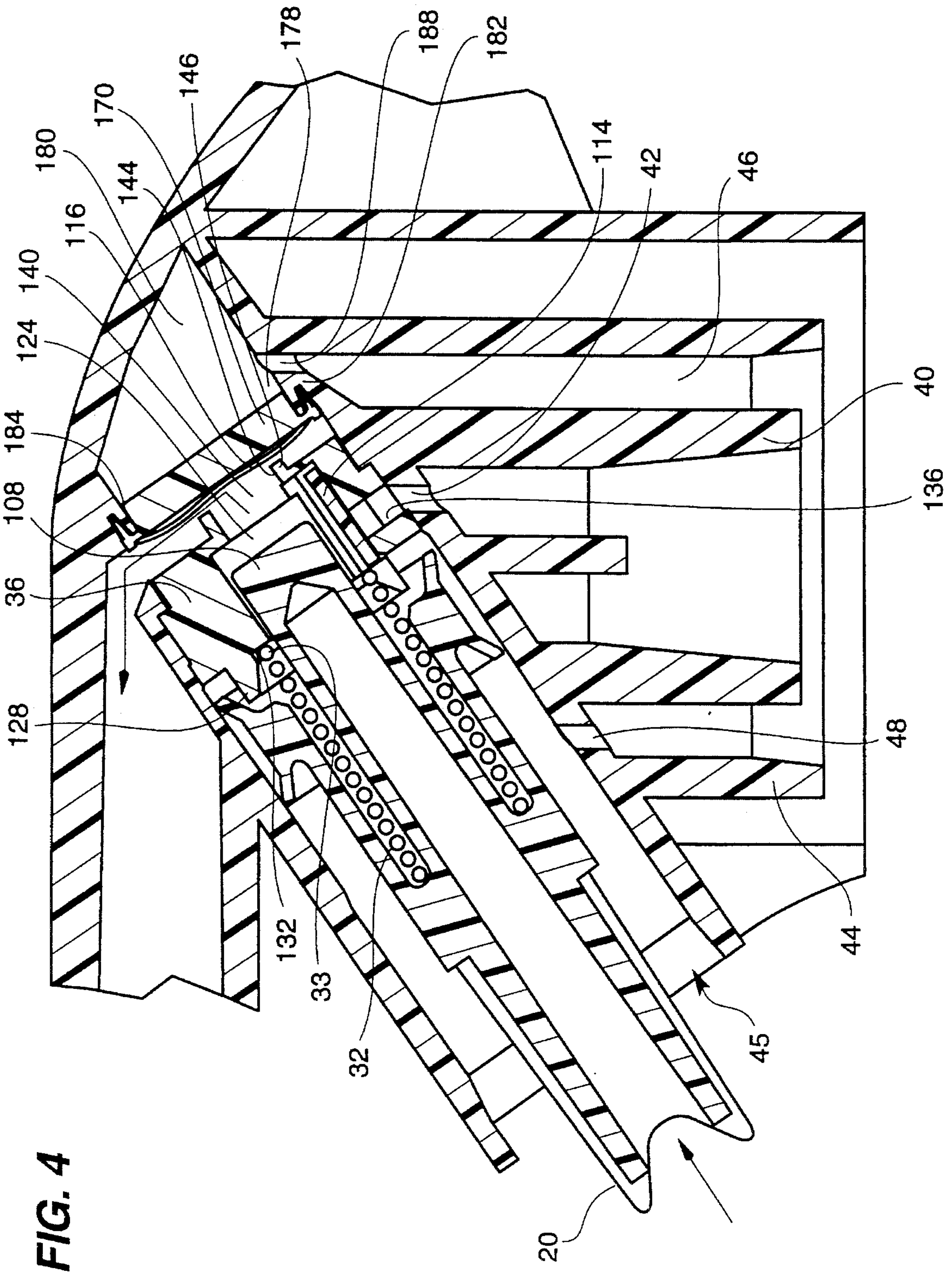
FIG. 4 is a fragmentary sectional view of a portion of the trigger sprayer shown in FIG. 3 and shows the precompression valve at the completion of a pumping stroke.
Figure 5:
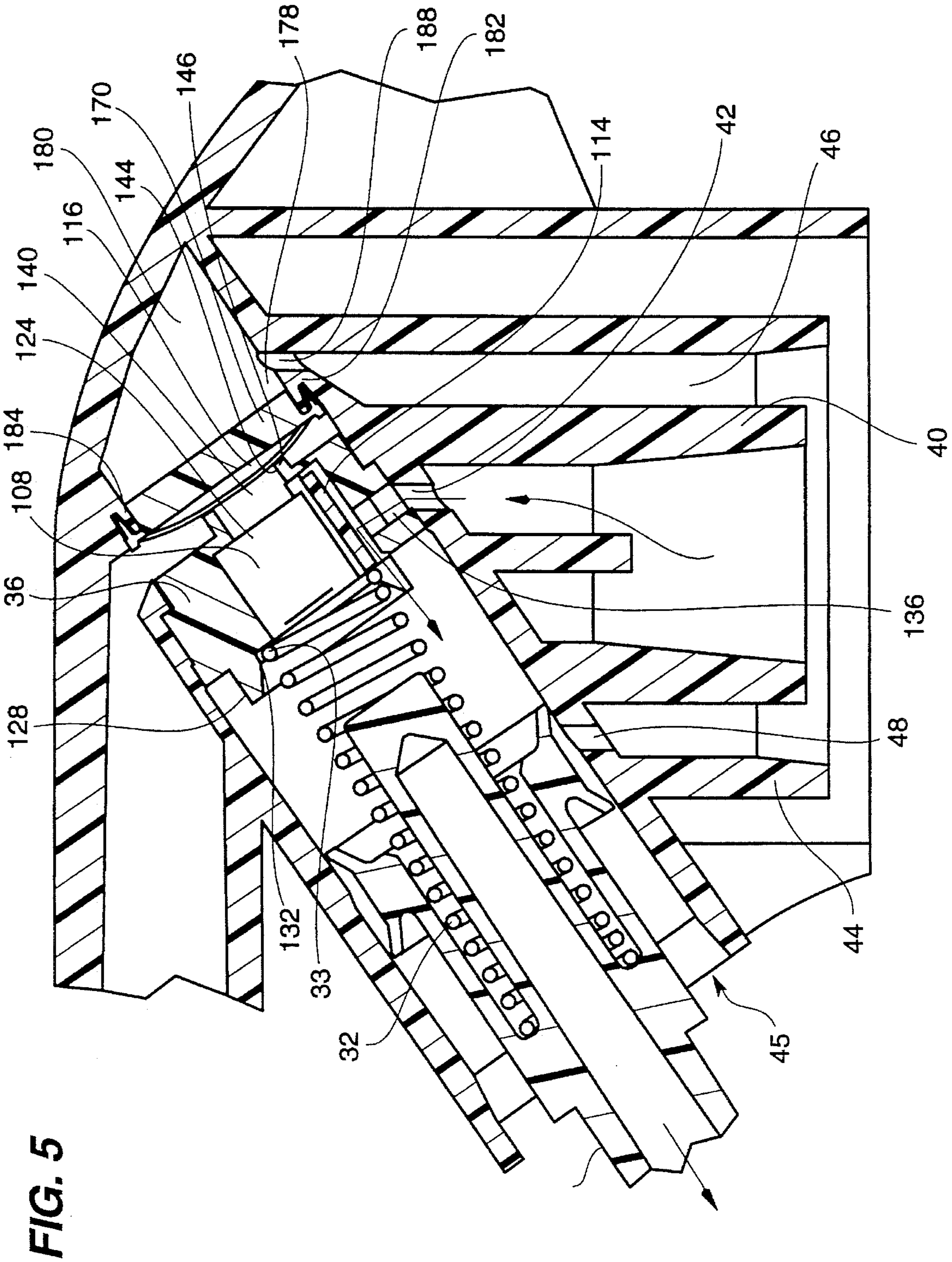
FIG. 5 is a fragmentary sectional view of a portion of the trigger sprayer shown in FIG. 3 and shows the compression valve at the beginning of a release or return stroke.

The plate or flap valve 114 is initially integrally formed with the valve body 36 at a lower side thereof by fillets or webbings (not shown) and broken off during assembly and mounted inside an axially extending slot 118 having opposites sides 120 and 122 in the lower part of the valve body 36 which is located above the inlet port 42 as best shown in FIGS. 4 and 5. Initially the plate 114 is fixed by two fillets to the sides 120 and 122 of the slot 118 near the front end 34 of the generally cylindrical valve body 36 almost at the position shown in FIG. 6.

The valve body 36 has a central passage 124 that extends axially substantially through the body 36 and is essentially a cylindrical cavity 124. This cylindrical cavity 124 receives therein the generally cylindrical end portion 108 of the piston 20 as shown in FIG. 4.

Extending outwardly from the valve body 36, forwardly toward the piston is a generally cylindrical flange 128 which has an inner tapered, conically shaped, or beveled surface 129 for facilitating insertion of the inner end 33 of the spring 32 into the area around the cylindrical cavity 124 and radially outwardly thereof, but radially inwardly of the cylindrical flange 128. In this respect, a shoulder 132 is provided on the outer end 34 of the valve body 36 against which the inner end 33 of the spring 32 is received.

The cylindrical end portion 108 of the piston 20 is received in the cylindrical cavity 124 as best shown in FIG. 4.

Figure 7:
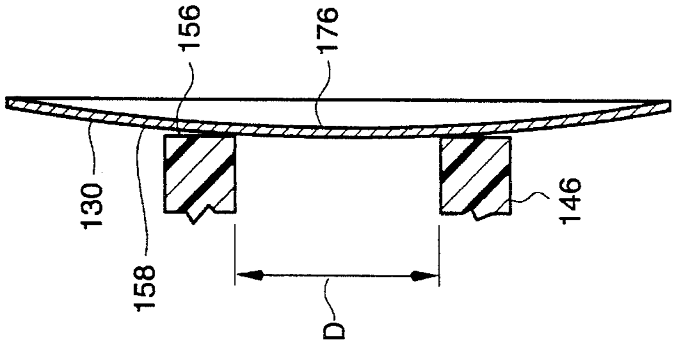
FIG. 7 is a fragmentary sectional view of a shallow dome shaped spring valve element positioned against a free edge of an annular wall inside a valve body of the precompression valve assembly shown in FIG. 6 when the dome shaped spring valve element is an at rest position.
Figure 6:
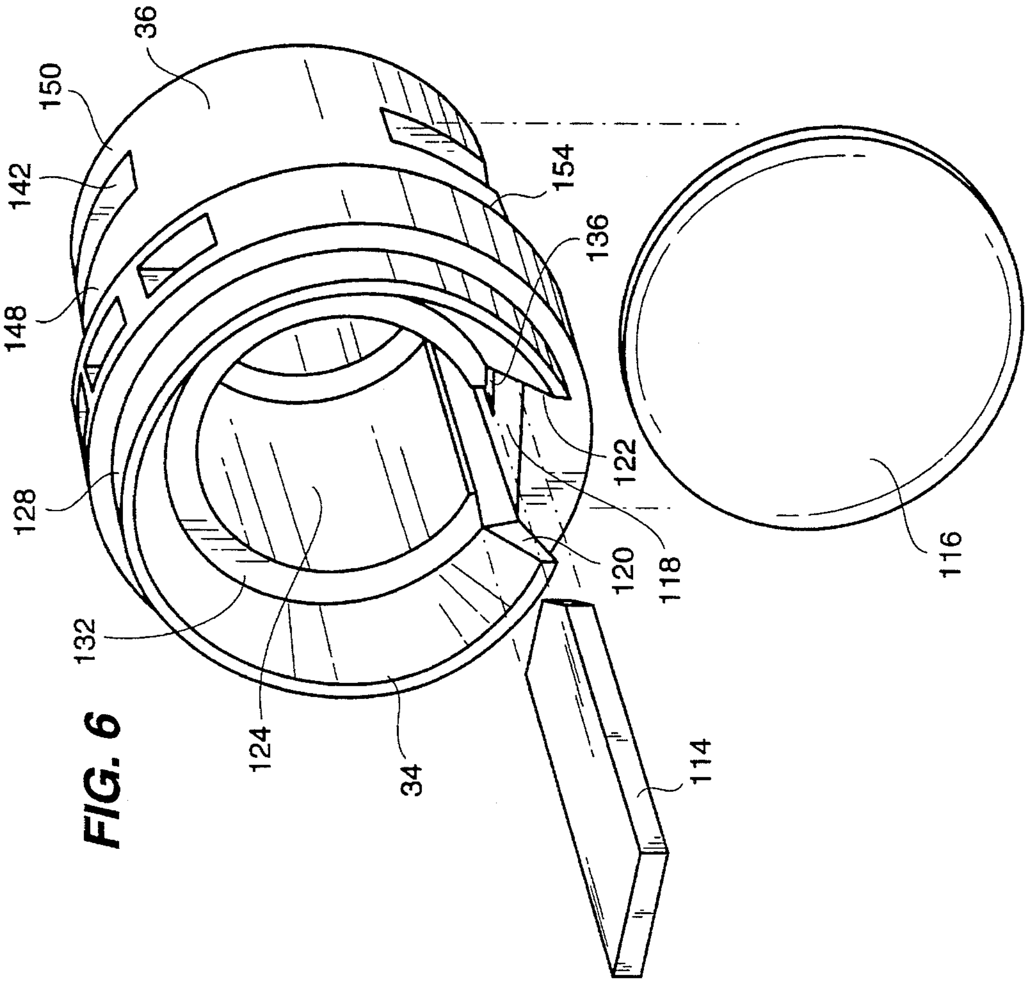
FIG. 6 is an exploded perspective view of the precompression valve assembly shown in FIG. 3.
Figure 10:
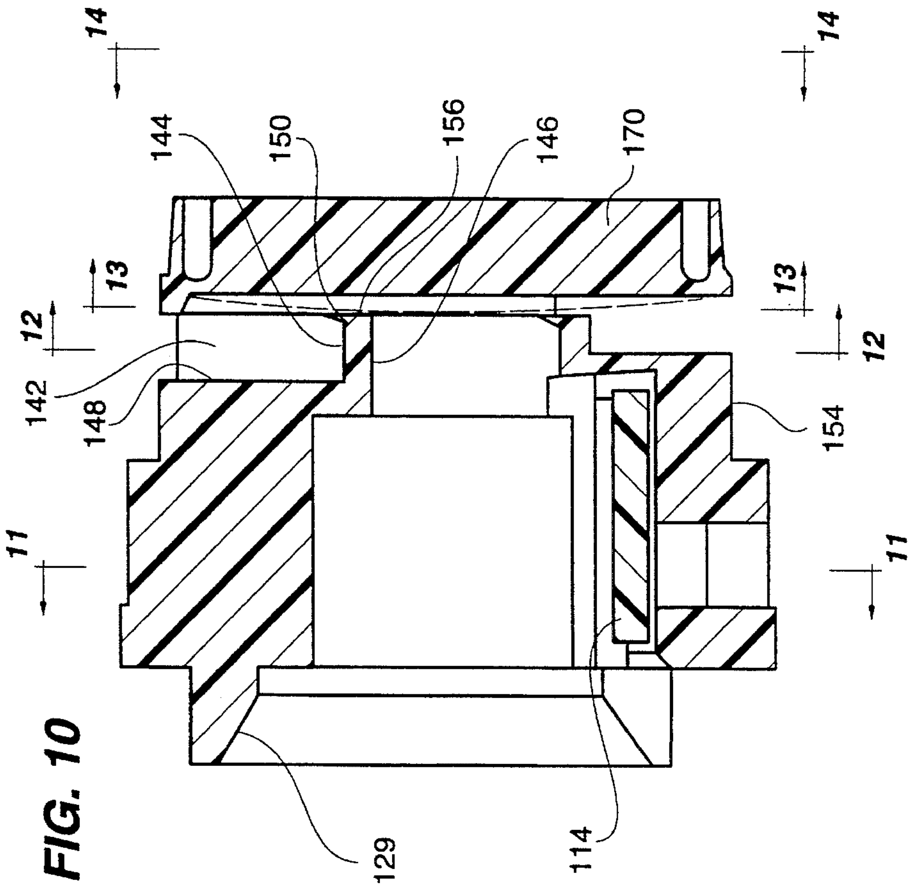
FIG. 10 is a sectional view of the precompression valve assembly and is taken along line 10—10 of FIG. 9.
Figure 9:
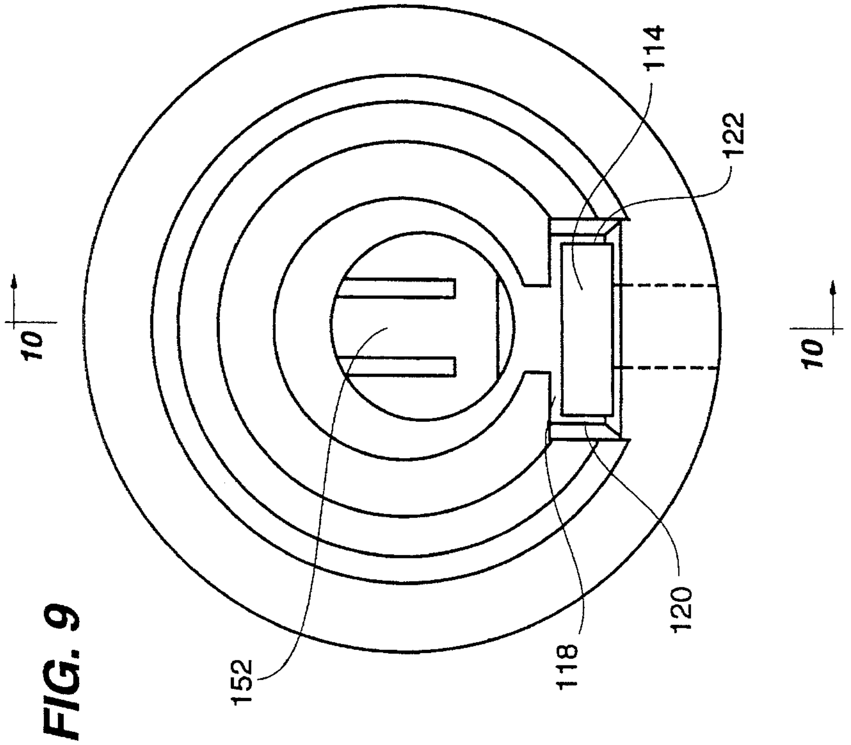
FIG. 9 is a front elevational view of the body of the precompression valve assembly shown in FIG. 6.

The valve body 36 includes an inlet port 136 which communicates the slot 118 in the valve body with the inlet port 42 and the slot 118 communicates with the cylindrical cavity 124. A bore 140 with a smaller diameter than the diameter of the cylindrical cavity 124 extends rearwardly from the cylindrical cavity 124 to a transverse slot 142 which extends transversely of the cylindrical valve body 36. This bore 140 is defined in part by an inner wall surface 144 of a short annular wall 146 which extends rearwardly from a forward side 148 of the transverse slot 142 toward a back side 150 of the transverse slot 142. The back side 150 is connected by a webbing 152, shown best in FIGS. 12 and 13, to a front portion 154 of the valve body 36. A rear outer edge 156 of the short annular wall 146 defines a valve seating surface for a convex side 158 of the dome shaped spring valve element 116 which seats thereagainst as best shown in FIGS. 7 and 10.

Formed in the valve body 36 adjacent the cylindrical cavity 124 therein is the slot 118 as best shown in FIGS. 4, 5, 10 and 11 which receives the valve plate or flap 114.

Figure 11:
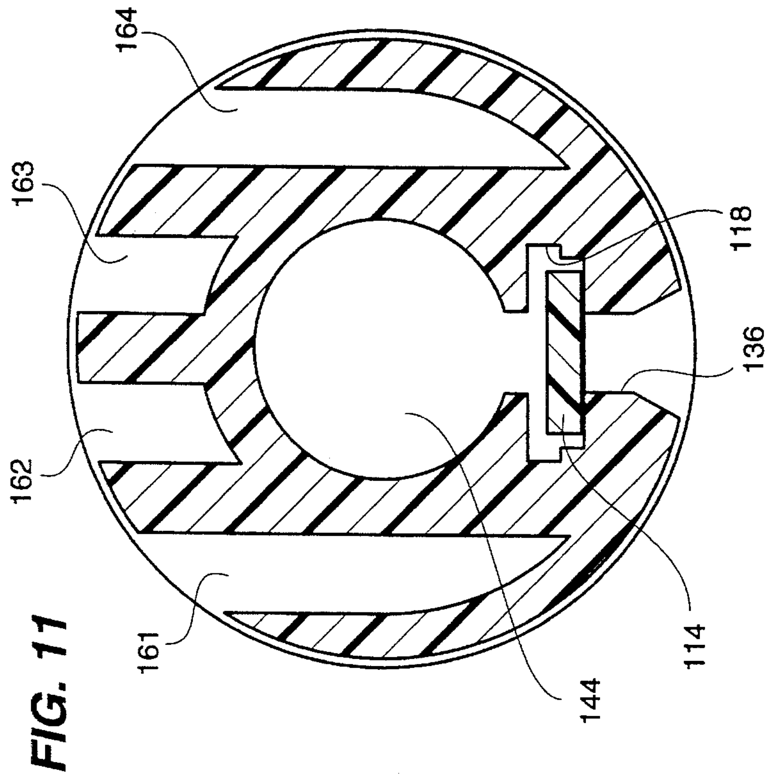
FIG. 11 is a sectional view of the precompression valve assembly and is taken along line 11—11 of FIG. 10.

For molding purposes, the valve body 36 includes cord-like slots 161–164 shown in FIG. 11. Except for the webbing 152, the transverse slot 142 extends transversely or diametrically across and through a major portion of the valve body 36.

The back side 150 of the transverse slot 142 defines the front side 150 of a rear wall 170 of the valve body 36 and preferably has openings 174 therethrough to enable the pressure of the ambient air to be exposed to a concave rear side 176 of the slightly dome shaped spring valve element 116. In this respect, reference is made to FIGS. 4 and 5 where it can be seen that the rear wall 170 of the valve body 36 is pressed, in a seal tight matter, into an outer end 178 of a cavity 180 in the sprayer body 14 behind the pumping cylinder 22. For this purpose, the sprayer body 14 in the area in front of the cavity 180 has an annular slot 182 surrounding the cavity 180 so as to define an outer end flange 184 for the cavity 180 to facilitate flexing of the end flange 184 when the rear wall 170 is pressed into the outer end 178 of cavity 180.

A vent hole 188 extends from the cavity 180 through the sprayer body 14 to the annular chamber 46 between the two cylinders 40 and 44. As stated above, the annular chamber or space 46 is in communication with the vent port 48 so that when the double lip sealing structure 104 of the piston 20 is moved inwardly of the vent port 48, not only is the bottle of the container exposed to ambient air pressure, but also the space in the cavity 180 behind the pumping cylinder 22 is exposed to ambient air pressure to place ambient air pressure against the concave side 176 of the valve element 116.

Figure 12:
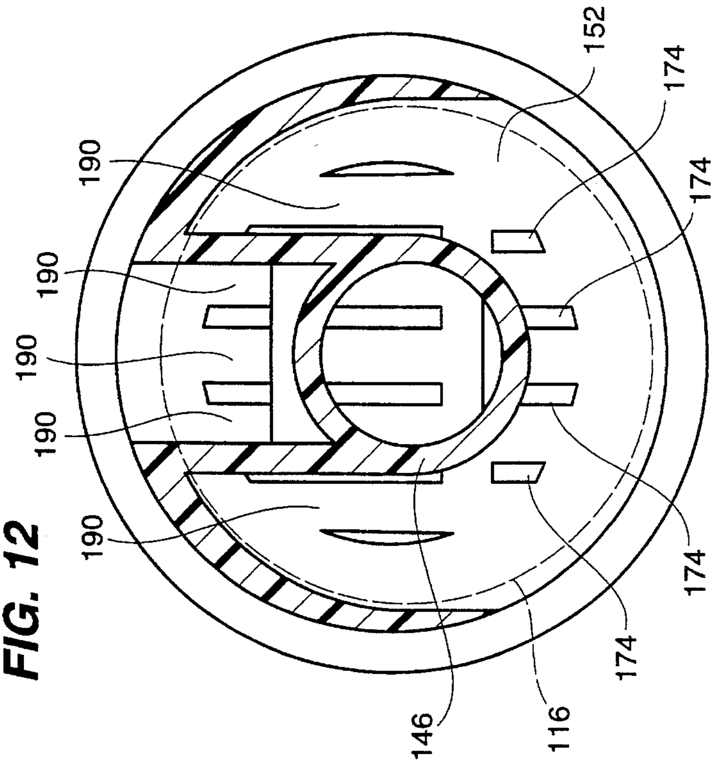
FIG. 12 is a vertical sectional view of the precompression valve assembly and is taken along line 12—12 of FIG. 10.
Figure 14:
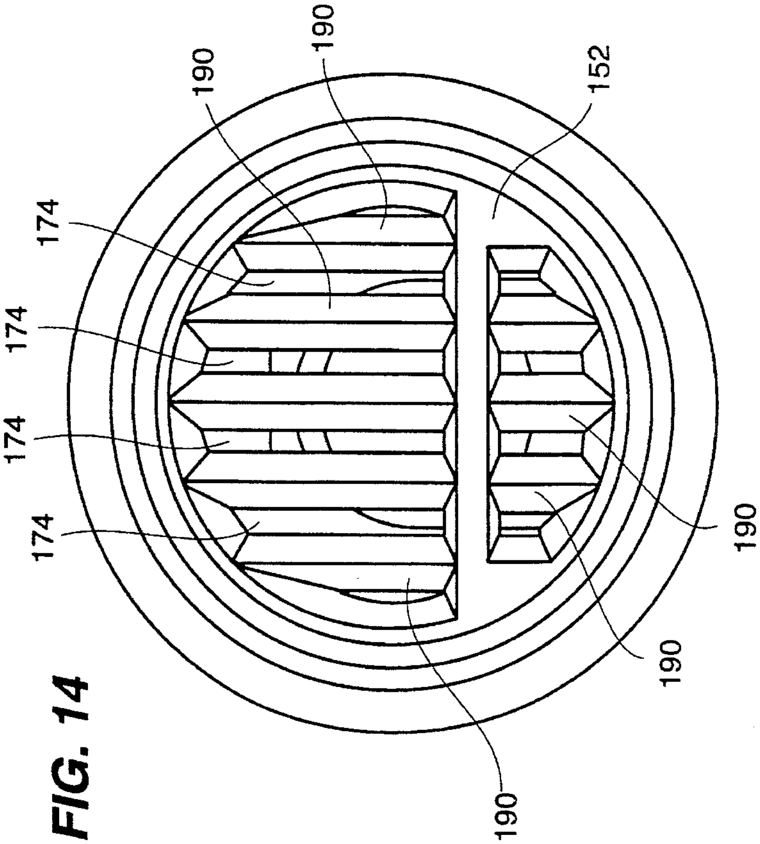
FIG. 14 is a rear end view of the valve body shown in FIG. 10 and is taken along line 14—14 of FIG. 10.
Figure 13:
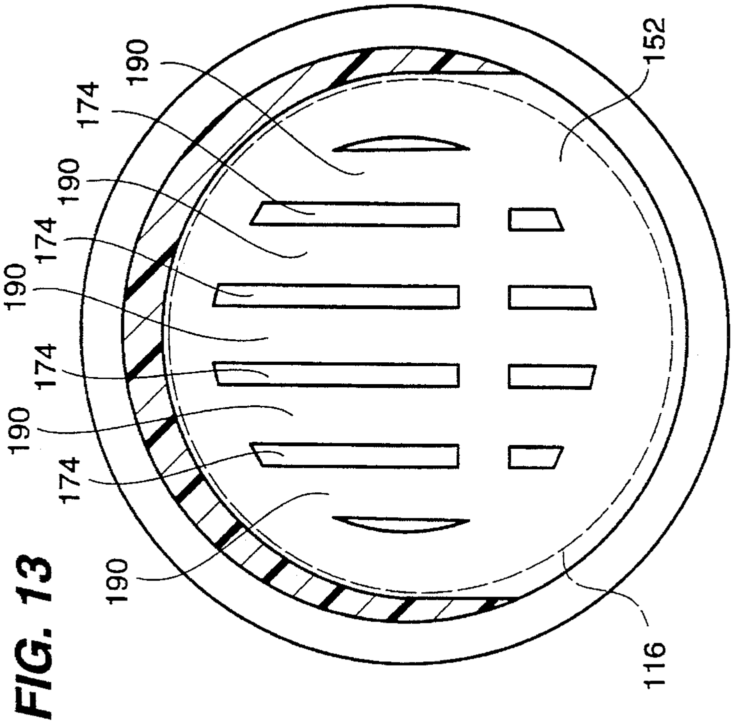
FIG. 13 is a sectional view of the precompression valve assembly and is taken along line 13—13 of FIG. 10.

As best shown in FIGS. 12, 13, and 14, the rear wall 170 has triangular in cross section ribs 190 extending thereacross between the openings or slots 174. The slots 174 enable the ambient air pressure to be presented to the back or concave side 176 of the dome shaped spring valve element 116.

Figure 8:
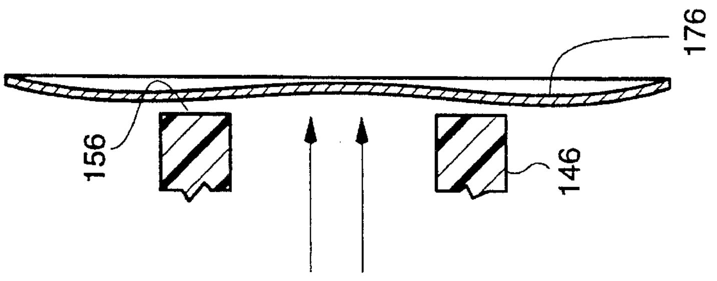
FIG. 8 is a fragmentary sectional view, similar to the view shown in FIG. 7, of the dome shaped valve element, but shows displacement of the valve element after a predetermined pressure has been established in the cylinder of the trigger sprayer body during a compression or pumping stroke of the piston.

As best shown in FIGS. 4 and 8 when the pressure builds up in the pumping cylinder 22 during inward movement of the piston 20, the valve element 116 flexes and pressurized liquid is ejected into the waterway 54. The pressure required is determined by the exposed area of the convex side 158 of the dome shaped valve element 116 which is determined by the inside diameter D (FIG. 7) of the short annular wall 146.

On a return stroke of the piston 20 to its at rest position, the dome shaped spring valve element 116 returns to its sealed/closed position as shown in FIGS. 5 and 7.

Figure 15:
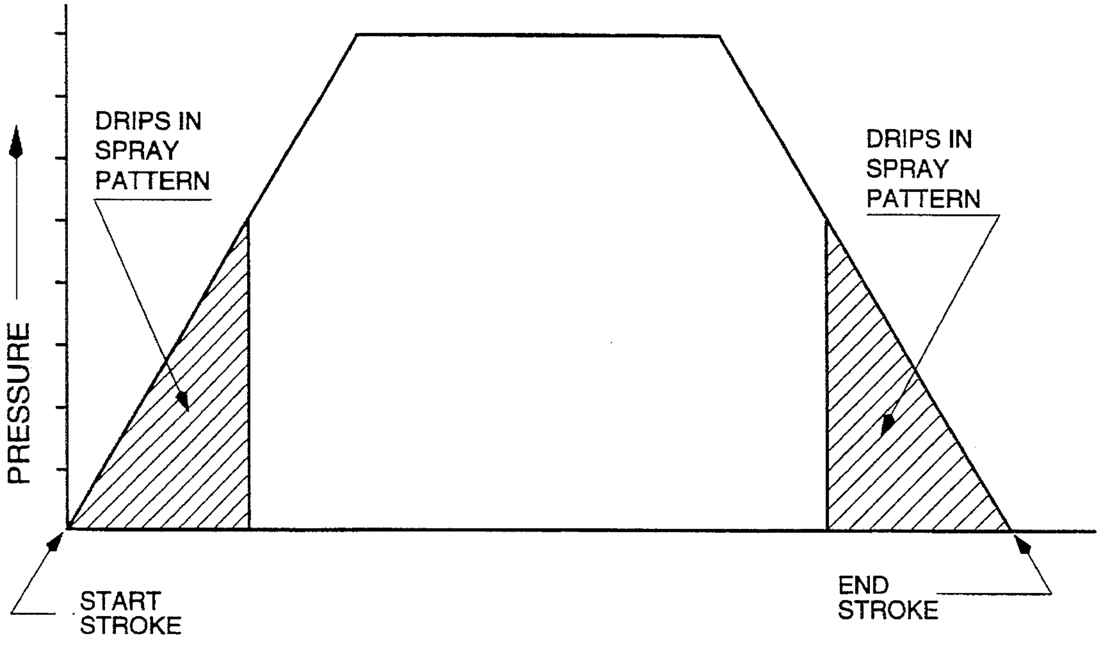
FIG. 15 is a graphical representation approximating the pressure vs. liquid flow relationship during a pumping stroke of a piston in a standard trigger sprayer.

In FIG. 15, there is illustrated the pressure vs. liquid flow out of the nozzle 16 of a standard trigger sprayer. This is an approximation of the pressure-liquid flow relationship during a pumping stroke of a piston in a cylinder in the body of a standard trigger sprayer. Here, it is shown that as the pressure is building up or decreasing, there will be drips in the pattern being sprayed from the trigger sprayer at the beginning of the stroke and near the end of the stroke.

Figure 16:
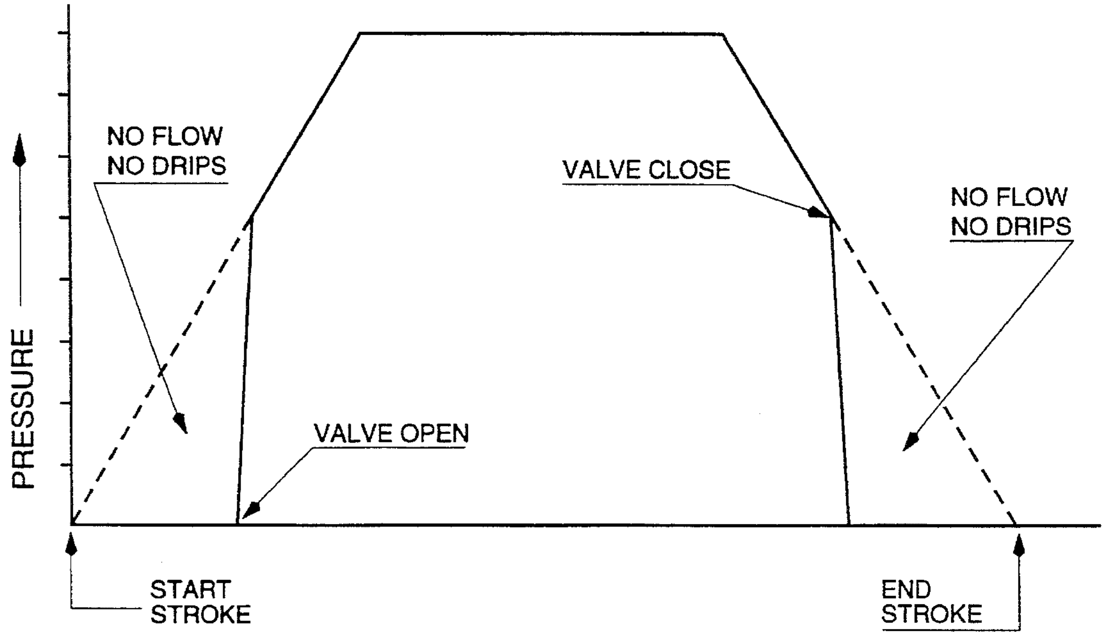
FIG. 16 is a graphical representation approximating the pressure vs. liquid flow relationship during a pumping stroke of a piston in the trigger sprayer of the present invention having the precompression valve assembly therein.

Then, as shown in FIG. 16 when the precompression valve assembly 12 of the present invention is closed, there is no flow and no drips at the start of the stroke and, when the valve assembly opens, there is a sufficiently high pressure so that there is an immediate spray pattern from the outlet orifice in the nozzle 16 until the pressure in the pumping cylinder 22 decreases to a predetermined value where the precompression valve assembly 12 closes and again there is no flow or drips from that point to the end of the stroke of the piston 20. On release of the trigger 24 and while the piston 20 is moving under the force of the spring 32 to its at rest position during the return stroke of the piston 20, the valve assembly 12 is closed and there is no flow or drips.

In FIGS. 17–23 there is illustrated another embodiment of a precompression valve assembly 200 constructed according to the teachings of the present invention. The precompression valve assembly 200 includes a valve body 202 which is received in a pumping cylinder 203 in the sprayer body 14, an generally circular inlet plate or flap valve 204 received in a generally square-in-cross-section opening 206 formed in a bottom side 208 of the valve body 202 and a dome shaped spring valve element 210 mounted at a rear end 212 of the valve body 202. In this embodiment the transverse slot 142 found in the valve body 36 of the first embodiment is omitted and the valve element 210 is mounted at the rear end 212 of the valve body 202.

Figure 17:
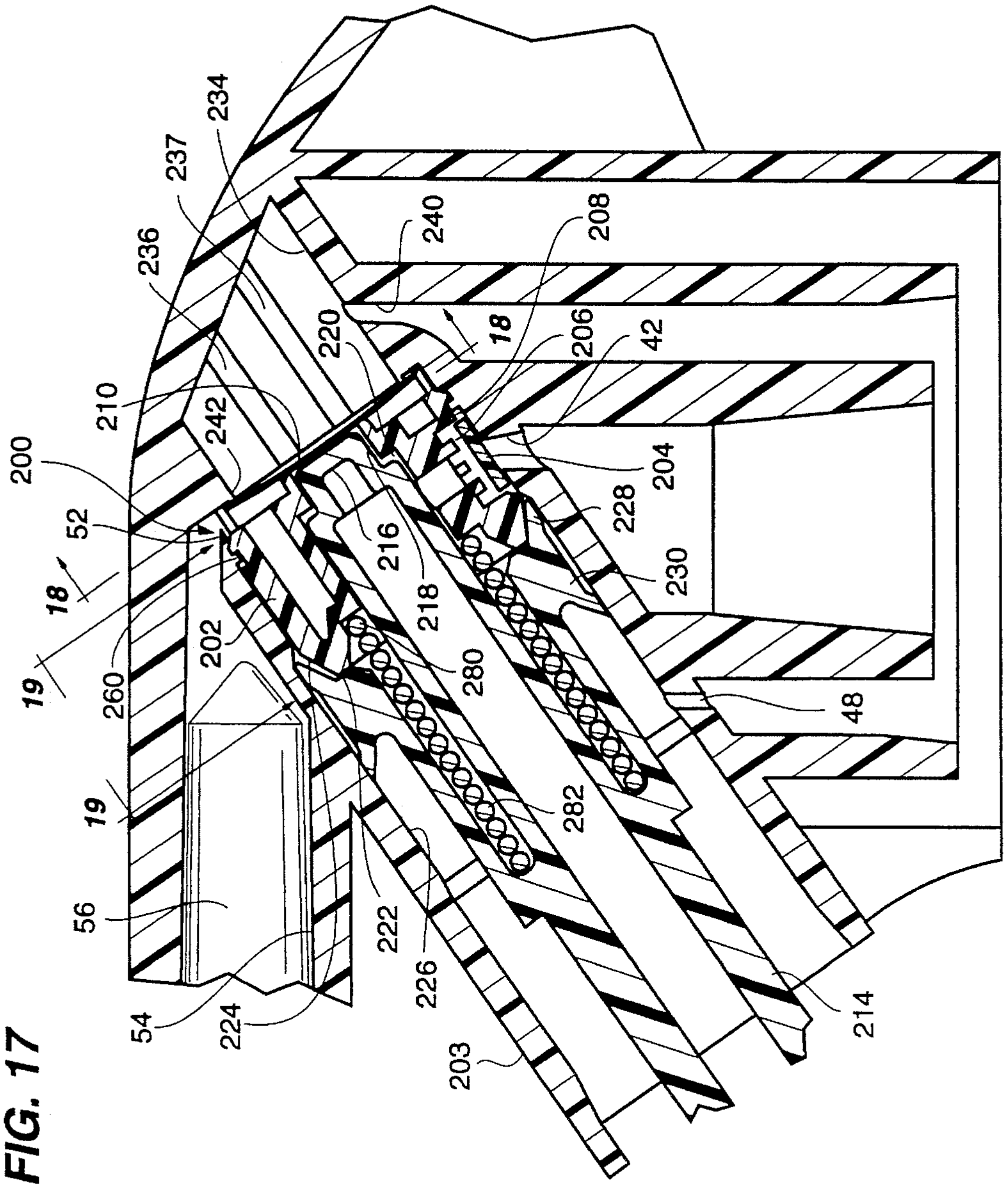
FIG. 17 is a fragmentary vertical section view, similar to the view shown in FIG. 4, of a portion of the body of another trigger sprayer having a modified precompression valve constructed according to the teachings of the present invention and shows the precompression valve at the completion of a pumping stroke.

As shown in FIG. 17 a modified piston 214 is provided which has a modified proximal end 216. The proximal end 216 is a reduced-in-diameter end 216 which is sized to be received in a short cylindrical passageway 218 formed in the valve body 202 between the rear end 212 and a central passage 220 in the valve body 202 which communicates with the cylinder 203 receiving the piston 214.

In most other respects, the piston 214 is substantially identical to the piston 20 in the first embodiment.

The diameter of the short cylindrical passageway 218 or inner diameter of the short annular wall 146 is preferably between one (1) millimeter and ten (10) millimeters. The edge between the passageway of the short cylindrical passageway 218 within the short annular wall 146 and the rear outer edge 156 can be a sharp edge or can be a round with a small radius. Also the dome shaped spring valve element 116 or 210 can have a radius between five (5) millimeters and one hundred (100) millimeters.

As shown in FIG. 17, a front end 222 of the valve body 202 has a bevelled or tapered wall surface 224 to provide a space between the beveled wall surface 224 and the wall surface 226 of the cylinder 203 for receiving the proximal lip 228 of a double lip piston seal 230.

Various types and shapes of spring valve elements have been explored and it is to be understood that the spring valve element of the present invention can be made of plastic or stainless steel, e.g. chrome nickel steel, or any other metal or plastic, with or without a coating. Also, the spring valve element can have different shapes, such as a flat shape, like a coin, or an shape including an annular, part spherical, outer portion and a flat middle portion with either portion being the valve seating portion, or a dome shape as described above.

Similarly, the reduced-in-diameter end 216 of the piston 214 is received in and fills much of the space in the short cylindrical passage 218. With this construction, a minimal amount of dead space is provided between the piston 214 and the dome shaped valve element 210 at the completion of a pumping stroke of the piston 214.

Figure 18:
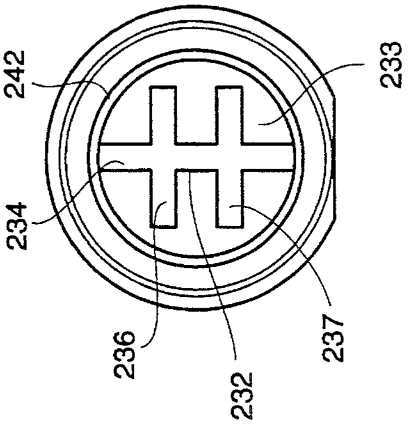
FIG. 18 is a sectional view taken along line 18—18 of FIG. 17 and shows cross ribbing in a cavity located behind a dome shaped valve element of the precompression valve assembly at the rear for proximal end of the precompression valve assembly.

FIG. 18 is a fragmentary sectional view of a rear end wall 32 of the cylinder 203 and shows a cavity 233 having a diametrical rib 234 positioned behind the valve element 210 and having two (2) cross ribs 236 and 237 that extend both in a direction coaxial with the axis of the piston 214 and the cylinder 203 and transversely thereof. The space or area of the cavity 233 between the ribs 234,236 and 237 opens onto the rear end wall 232.

The cavity 233 also communicates with a vent port 240 in the sprayer body 14 which opens into an annular space that also communicates with the vent port 48 that communicates with the cylinder 203. An annular rib 242 is provided around the diametrical slot 234 and provides a seat for a concave side 244 of the dome shaped valve element 210. A convex side 246 of the dome shaped valve element 210 seats against a proximal outer edge or outer end 248 of a short annular wall 250 which extends rearwardly of a bottom wall 252 of a cylindrical cavity 254 which is located at the rear end 212 of the valve body 202 and which receives the valve element 210. The annular wall 250 surrounds, and has an inner wall surface 255 (FIG. 20) defining part of, the short cylindrical passageway 218.

Figures 19, 20, 21:
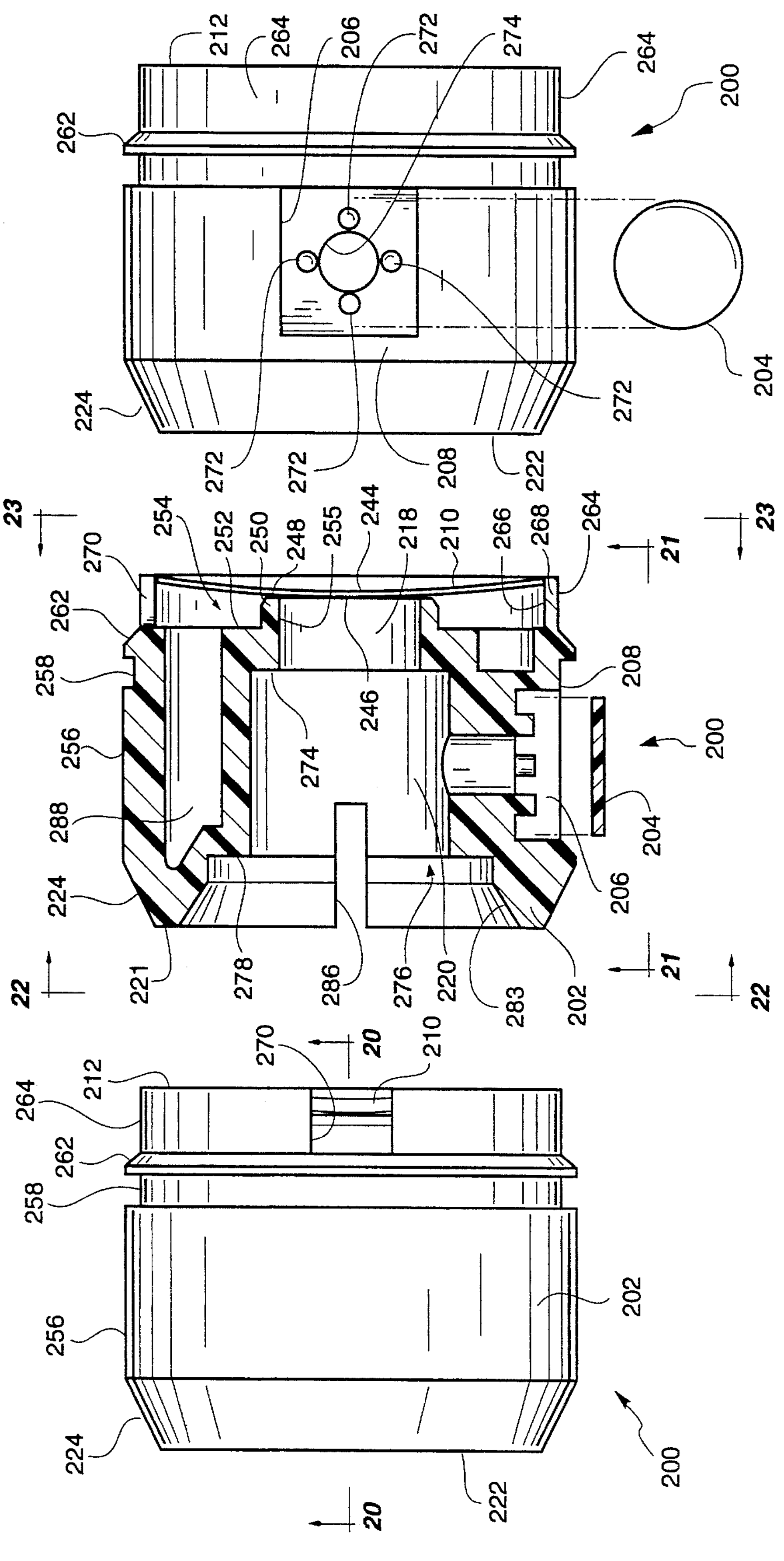
FIG. 19 is a side elevational view of the precompression valve shown in FIG. 18.
FIG. 20 is a vertical sectional view of the valve assembly shown in FIG. 19 taken along line 20—20 of FIG. 19 and shows the complete assembly, including a valve body, an inlet/valve member and a dome shaped spring valve element.
FIG. 21 is a bottom view of the precompression valve body shown in FIG. 20 and is taken along line 21—21 of FIG. 20.

FIG. 19 is a top plan view of the valve body 202 and shows that it has the beveled wall surface 224 that tapers to the front end 222 from a cylindrical surface 256 that extends rearwardly to an annular slot 258 and extends around a substantial portion of the valve body 202 and is adapted to snap-fittingly engage with an annular rib 260 (FIG. 17) located near the inner or proximal end wall 232 of the cylinder 203 for locking the valve body 202 in place at the inner end of the cylinder 203 and with a slight pressure established by the outer end 248 of the short annular wall 250 of the convex side 46 of the spring valve element 210, as shown in FIG. 17.

Then an outer surface 262 of the valve body 202 tapers inwardly providing a beveled or conical wall surface 262 for facilitating deflection of the beveled wall surface 262 past the annular rib 260 when the valve body 202 is inserted into the cylinder 203.

Next a reduced-in-diameter outer cylindrical wall surface 264 extends proximally to the rear edge 212 of the valve body 202. The area inwardly of this outer reduced-in-diameter cylindrical surface 264 is cut away to form an inner wall surface 266 defining the cylindrical cavity 254 and a short outer cylindrical wall 268 defined between the wall surfaces 266 and 264.

As shown in FIGS. 19 and 20, a portion of the outer wall 268 is cut away to establish a slot or outlet passageway 270 from the valve body 202 to the outlet port 52 in the trigger sprayer body 14 communicating with the waterway 54.

As shown in FIG. 20, the dome shaped spring valve element 210 is received within the cavity 254 within the outer cylindrical wall 268 adjacent the rear edge 212 thereof and a rear edge 248 of the inner short annular wall 250 engages the convex side 246 of the dome shaped spring valve element 210.

In FIGS. 20 and 21, there is illustrated the circular plate 204 which is received in the short square-in-cross-section cavity 206 formed in the bottom side 208 of the valve body 202. Upward movement of the plate or flap 204 in the cavity 206 is limited by four equally spaced detents or short posts 272 positioned around a liquid inlet port 274 extending through the valve body 202 between the cavity 206 and the central cylindrical passage 220 in the valve body 202.

As shown in FIG. 20, the short cylindrical passageway 218 extends from an inner annular wall surface 274 in the valve body 202 at the inner end of the cylindrical passage 220 rearwardly to the rear edge 248 of the inner short annular wall 50.

The central passage 220 extends forwardly from the inner annular wall surface 274 to a larger-in-diameter short cylindrical cavity 276 defining a shoulder 278 against which a proximal end 280 of a spring 282 situated between the piston 14 and the valve body 202 seats. Then, a conical wall surface 83 extends forwardly and outwardly from the short cylindrical cavity 276 to the front edge 222 of the valve body 202.

Figure 22:
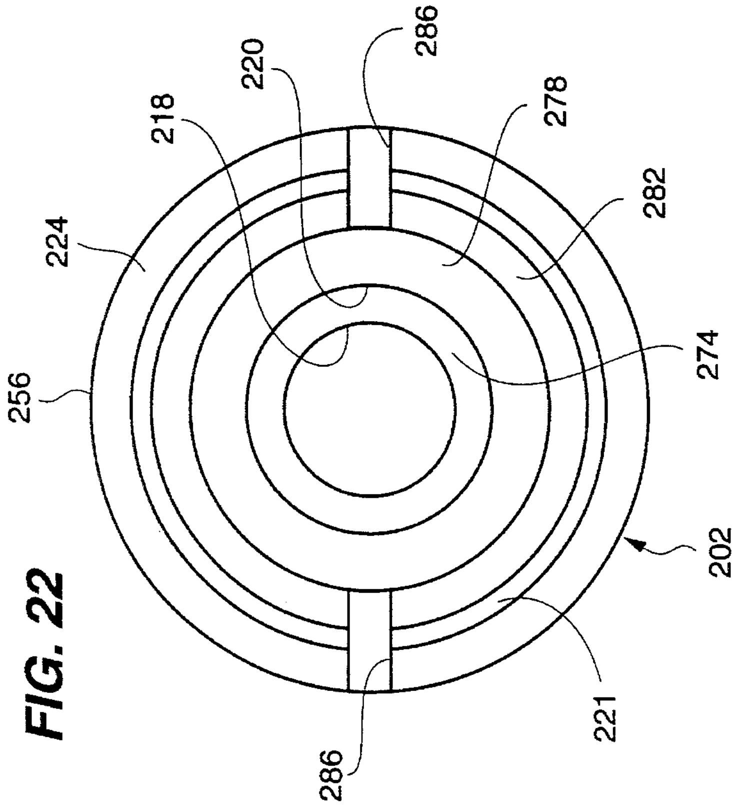
FIG. 22 is a rear end view of the valve body shown in FIG. 20 without the dome shaped spring valve element taken along line 22—22 of FIG. 20.

As shown in FIGS. 20 and 22, side slots 286 are provided in the valve body 202.

Figure 23:
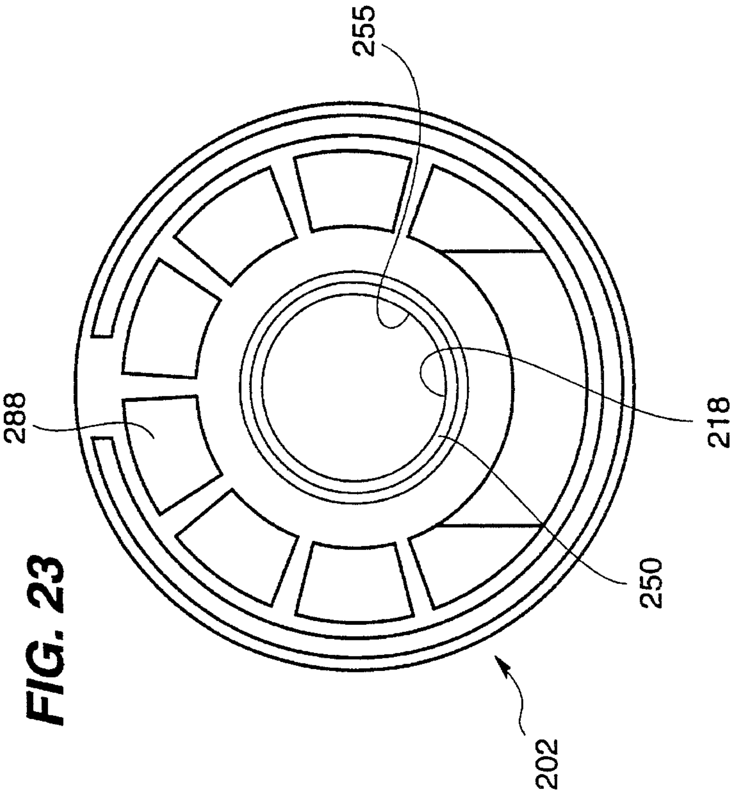
FIG. 23 is a front end view of the valve body shown in FIG. 20 and is taken along line 22—22 of FIG. 20.

FIG. 23 is a rear end view of the valve body 202 and shows axially extending slots 288 extending into the valve body 202.

With reference to FIGS. 17 and 20, it will be understood that upon a compression stroke or pumping stroke of the piston 214 liquid is force against the convex side 246 of the dome shaped spring valve element 210 and, at a predetermined pressure, deflects the valve element 210 rearwardly to allow liquid to escape under pressure through the slot 270, the outlet port 52 and the waterway 54. The filler member 56 establishes a small volume in the waterway so that the pressure of the liquid is maintained at a high level as the pressurized liquid travels through the waterway 54 to the nozzle 16.

During the compression stroke the double lip piston seal 230 moves inwardly past the vent port 48 to communicate ambient pressure through the annular space 46 to the cavity 233 so that ambient pressure is established at the concave side 244 of the valve element 210. Also, the vent port 48 allows any liquid that somehow gets past the spring valve element 116 or 210 to flow back into the container attached to the trigger sprayer 10.

Then, on a return stroke to an at rest position a vacuum is created in the pumping cylinder 203 which causes the cylindrical plate 204 to be pulled upwardly against the short posts or detents 272 so that, liquid from the container to which the sprayer body 14 is attached, is drawn upwardly around the plate valve 204 and through the inlet port 42 in the sprayer body 14 into the cylinder 203 to ready the trigger sprayer for a subsequent pumping stroke.

Figure 24:
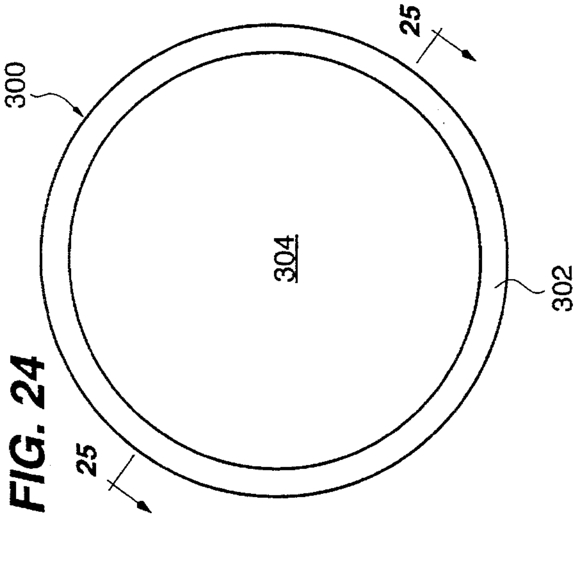
FIG. 24 is a plan view of another embodiment of a dome shaped spring valve element.
Figure 25:
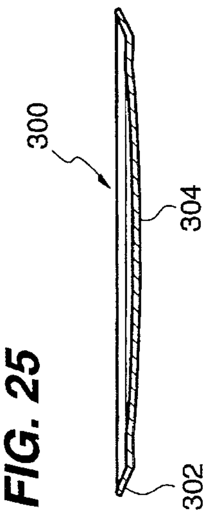
FIG. 25 is a sectional view of the valve element shown in FIG. 24 and is taken along line 25—25 of FIG. 24.

In FIGS. 24 and 25, there is illustrated one embodiment of a dome shaped spring element 300 which is made of a CrNi stainless steel spring material by stamping it from a sheet of the stainless steel material. The dome shaped spring element 300 has a thickness of approximately 0.1 mm. plus or minus 0.005 mm. The overall diameter of the spring valve element 300 is approximately 9.5 plus 0 to minus 0.05 mm.

The dome shaped spring valve element 300 has an outer frusto-conical annular rim portion 302 formed during the stamping of the valve element 300. The depth or total width of the spring valve element 300 is 0.48 plus or minus 0.05 mm. The valve element 300 has a dome shaped central portion 304 which has an outer diameter of approximately 8.5 plus or minus 0.1 mm. and a radius of approximately 40 mm. plus or minus 3

Figure 26:
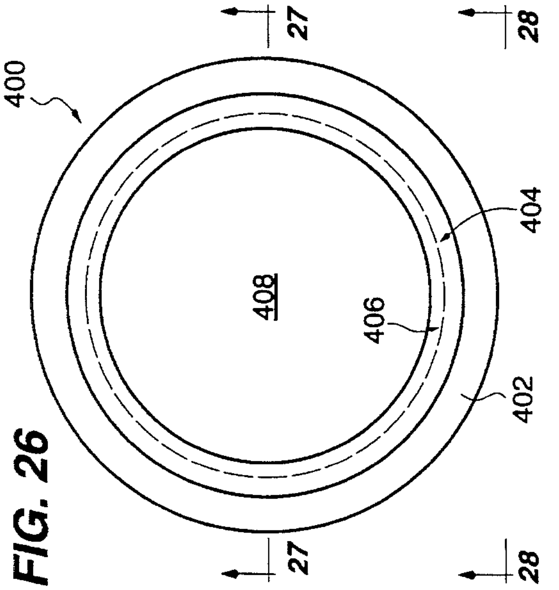
FIG. 26 is a plan view of a further embodiment of a dome shaped spring valve element.
Figure 27:
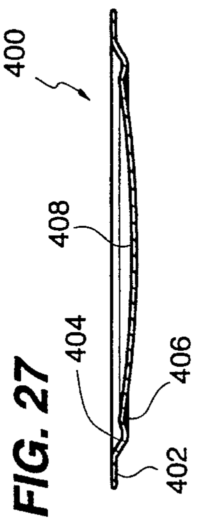
FIG. 27 is a sectional view of the valve element shown in FIG. 26 and is taken along line 27—27 of FIG. 26.
Figure 28:
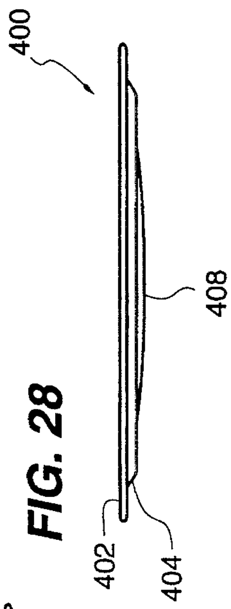
FIG. 28 is an edge view of the dome shaped spring valve element shown in FIG. 26 and is taken along line 28—28 of FIG. 26.

In FIGS. 26–28 there is illustrated another dome shaped spring valve element 400 stamped from a sheet of approximately 0.1 mm. thick CrNi steel material. Here the dome shaped spring valve element 400 has an overall diameter of approximately 9.5 mm. and has an outer annular rim portion 402. Radially inwardly from there is an angularly downwardly extending frusto-conical annular portion 404 that extends downwardly an angle of approximately 153° from the horizontal. Then, an upwardly inclined frusto-conical annular portion 406 extends at an angle of approximately 12° to the horizontal upwardly a short distance of approximately of 0.3 mm. Then, the valve element 400 has a middle dome shaped portion 408 having a diameter of approximately 6.8 mm. and a radius of approximately 30 mm. plus or minus 2 mm. The diameter from the inner lower end of the annular frusto-conical portion 404 is approximately 7.4 mm. The thickness of the dome shaped spring valve element 400 is approximately 0.1 mm.

Figure 29:
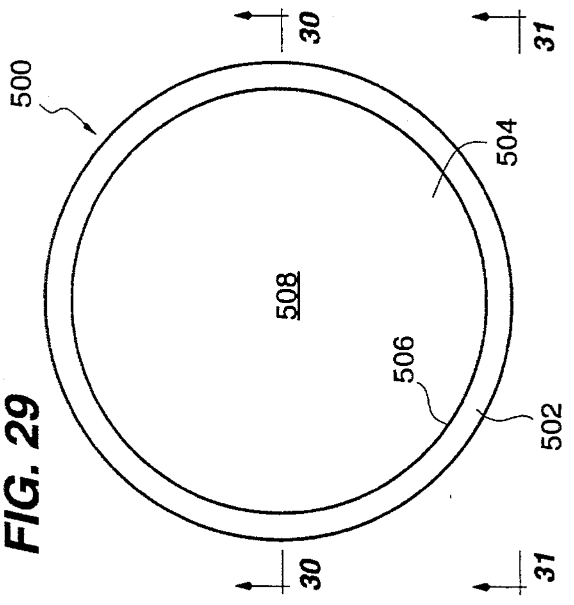
FIG. 29 is a plan view of still another embodiment of a dome shaped spring valve element.
Figure 30:
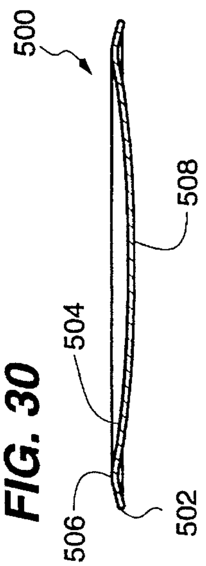
FIG. 30 is a sectional view of the valve element shown in FIG. 29 and is taken along line 30—30 of FIG. 29.
Figure 31:
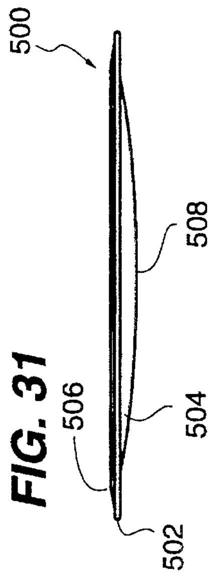
FIG. 31 is an edge view of the dome shaped spring valve element shown in FIG. 29 and is taken along line 31—31 of FIG. 29.

In FIGS. 29–31 there is illustrated still another embodiment of a dome shaped spring valve element 500. In this embodiment the dome shaped spring valve element 500 is stamped from a sheet of approximately 0.1 mm. thick CrNi steel. Here the valve element 500 stamped from the sheet of CrNi steel has an outer frusto-conical annular rim portion 502 that extends upwardly at an angle of approximately 10° to the horizontal to a middle dome shaped portion 504 having a diameter of approximately 8.5 mm. and a radius of approximately 24 mm. plus or minus 2 mm. The overall depth of the spring shaped valve element 500 is approximately 0.48 mm. from an upper ring 506 at the junction between the dome shaped portion 504 and the outer annular frusto-conical flange portion 502 and a bottom 508 of the dome shaped portion 504.

Figure 32:
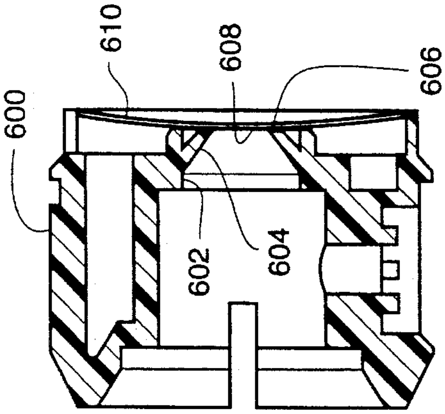
FIG. 32 is a sectional view of a modified body of a precompression valve assembly together with a dome shaped spring valve element and shows an annular conically shaped sealing lip formed within and at one end of a passage through the body for establishing a secondary seal with a convex side of the dome shaped spring element.

In FIG. 32 there is illustrated a modified valve body 600 having a short cylindrical passageway 602 (similar to the passageway 46 shown in FIG. 10 and the passageway 218 shown in FIG. 20). At an outer end of this passageway 602 there is provided an annular, generally conically shaped, sealing lip 604 extending radially inwardly and axially rearwardly of the passageway 602 and has an outer end edge 606 that is positioned to engage and bear and seal against a convex side 608 of a spring valve element 610. The annular sealing lip 604 and end edge 606 provide a secondary sealing surface against which the convex side 608 of the dome shaped spring valve element 610 can seal. In this respect, when pressurized liquid fills up the cylindrical passageway 602, and the pressure of the liquid is communicated to the outer end of the passageway 602, the pressure presses the sealing lip against the convex side 608 of the dome shaped spring valve element 610 thereby maintaining a tight seal against the valve element until the pressure applied causes the dome shaped spring valve element to flex as shown in FIGS. 7 and 8. The engagement of the sealing lip 604 with the dome shaped valve element 610 also prevents leakage when the trigger sprayer is not in use.

From the foregoing description, it will be apparent that the trigger sprayer 10 of the present invention, including the precompression valve assembly 12 or 200 of the present invention, has a number of advantages, some of which have been described above, some of which are inherent in the invention. Also it will be apparent that modifications can be made to the precompression valve assembly 12 or 200 of the present invention without departing from the teachings of the present invention. Accordingly, the scope of the invention is only to be limited as necessitated by the accompanying claims.

We claim:

1. A trigger sprayer comprising:

a body having a cylinder therein;

liquid inlet means in communication with said cylinder;

an outlet waterway in communication with said cylinder;

outlet nozzle means including a nozzle which has an outlet orifice and which is movable to and from a position in communication with said waterway;

a piston having an inner end and an outer end and being received in said cylinder;

a trigger operatively coupled to said body and acting on said outer end of said piston;

precompression valve means in a fluid path between said piston and said outlet orifice;

said precompression valve means being operable to allow liquid in a first part of said fluid path to reach said outlet orifice only after a predetermined pressure is established in said cylinder and to stop liquid from reaching said outlet orifice when the pressure in said cylinder falls below said predetermined pressure;

said precompression valve means comprising a valve body in said fluid path and having passage means, including a space, communicating between said piston and said outlet orifice, and comprising a spring valve element in said space whereby, when pressure is built up in said passage means upon movement of said piston into said cylinder, said spring valve element is caused to flex allowing liquid under pressure to escape past said spring valve element into a second part of said fluid path and out said outlet orifice in said nozzle; and, biasing means for biasing said piston away from said precompression valve means.

2. The trigger sprayer of claim 1 further including a filler member received in said waterway for minimizing the volume of said waterway.

3. The trigger sprayer of claim 1 wherein said liquid inlet means includes an inlet valve member.

4. The trigger sprayer of claim 3 wherein said precompression valve body is received in said cylinder adjacent an inner end thereof, said body having an open area in a bottom side thereof which is positioned a adjacent said liquid inlet means and said valve member is a generally planar valve which is located and constrained in the open area above an opening in a wall of said cylinder forming part of said liquid inlet means.

5. The trigger sprayer of claim 1 wherein said valve body is received in said cylinder, is generally cylindrical and has a generally elongate axis coaxial with the axis of said cylinder, and said passage means are axial passage means which extend generally axially from an outer end of said valve body into said valve body, said space being defined by a generally transversely extending slot in said valve body and said spring valve element being positioned in said transverse slot and having a valve seating surface on one side thereof closing off an inner end of said axial passage means and having a back side.

6. The trigger sprayer of claim 5 wherein said generally transverse slot is a diametrically extending slot that extends at least part way through said cylindrical valve body.

7. The trigger sprayer of claim 5 wherein said axial passage means is a central passage extending from said outer end of said valve body to said transverse slot.

8. The trigger sprayer of claim 5 wherein said valve body has an annular flange extending from a front wall thereof around said axially extending passage means and defining an annular shoulder on said outer end of said valve body around and radially extending of said axial passage means, and said biasing means including a coiled spring having an inner end which seats on said shoulder.

9. The trigger sprayer of claim 8 wherein said piston comprises an elongate body having annular sealing means extending therearound, a cylindrical projection which extends into said cylinder and into said axial passage means on an inward stroke of said piston into said cylinder, and which has an annular axially extending slot in said elongate body around said cylindrical projection for receiving an outer end of said coiled spring.

10. The trigger sprayer of claim 1 wherein said spring valve element has a dome shape with a convex side defining a valve seating surface.

11. The trigger sprayer of claim 10 wherein said valve body has, in said space, an annular axially extending wall around and forming part of an inner surface of said passage means and the convex side of said dome shaped spring valve element seats on the outer end of said annular wall.

12. The trigger sprayer of claim 10 wherein said valve body is received in said cylinder and includes a rear wall between an inner end of said valve body and said space, said rear wall having at least one opening therethrough whereby a concave side of said dome shaped spring valve element can be placed, at least during an outer stroke of said piston, in communication with the ambient atmosphere.

13. The trigger sprayer of claim 12 wherein said rear wall of said valve body is formed with a plurality of openings therein.

14. The trigger sprayer of claim 12 wherein a space is provided in said sprayer body behind said rear wall of said valve body and is in communication with an annular area around said liquid inlet means, said annular area being in communication with a vent port that extends from said annular area through a wall of said cylinder to said cylinder at a location that is forward and outward of said piston when said piston is at the end of its inner stroke into said cylinder whereby ambient air can pass through said cylinder through said vent port and into said annular area and from there into a container to which the trigger sprayer is connected for relieving the vacuum pressure created when liquid is withdrawn from said container and, at the same time, into said space behind said rear wall for exposing said concave side of said dome shaped spring valve element to the pressure of the ambient atmosphere thereby facilitating a quick return of said dome shaped spring valve element to its valve closed position when said piston beings its outer return stroke to its at rest position.

15. The trigger sprayer of claim 10 wherein the dome of said dome shaped spring valve element has a radius of curvature between approximately five (5) millimeters and one hundred (100) millimeters.

16. The trigger sprayer of claim 1 wherein said valve body is received in said cylinder, is generally cylindrical and has a generally elongate axis coaxial with the axis of said cylinder, and said passage means are axial passage means which extend generally axially from an outer end of said valve body into said valve body, said valve body having a shallow cavity, defining said space, at the rear end thereof within an outer annular wall of said valve body, and said spring valve element being positioned in said cavity and having a valve seating surface on one side thereof closing off an inner end of said axial passage means and having a back side.

17. The trigger sprayer of claim 16 wherein said axial passage means includes a central passage or cavity extending from an inner wall within said valve body to a shoulder in said valve body having an axially facing annular surface for receiving the inner end of a spring forming said biasing means, said spring being positioned between said valve body and said piston.

18. The trigger sprayer of claim 17 wherein said axial passageway flares outwardly from a position near said shoulder to forward outer end of said valve body.

19. The trigger sprayer of claim 17 wherein said axial passage means further includes a short cylindrical passageway extending rearwardly from said inner wall of said central passage to said valve seating surface of said spring valve element.

20. The trigger sprayer of claim 19 wherein said valve body has a short inner annular wall extending rearwardly from the bottom wall of said cylindrical cavity to said valve seating surface of said spring valve element and defining, in part, with an inner wall surface thereof, part of said short cylindrical passageway.

21. The trigger sprayer of claim 16 wherein said valve body is generally cylindrical and has an annular slot therein just forward of said outer cylindrically wall and the wall surface of said cylinder has an annular rib extending inwardly thereof which is adapted to be snap-fittingly received in said annular slot.

22. The trigger sprayer of claim 16 wherein said valve body has an opening in a bottom side thereof which receives a generally planar valve, said opening being juxtaposed to said liquid inlet means.

23. The trigger sprayer of claim 22 wherein said generally planar valve is generally circular and said opening is a generally square-in-crosssection cavity, wherein porous spacer means are provided between said generally planar valve and a bottom wall of said cavity and wherein said valve body has an inlet port extending between said bottom wall of said cavity and said axial passage means.

24. The trigger sprayer of claim 23 wherein said porous spacer means comprises at least three small protections extending outwardly from said bottom wall of said cavity toward said liquid inlet means.

25. The trigger sprayer of claim 16 wherein said piston has a rearwardly extending cylindrical body, an end portion of which is adapted and sized to be received in a central cylindrical passage of said axial passageway means.

26. The trigger sprayer of claim 25 wherein said axial passage means includes a short cylindrical passageway having a diameter less than said central passage extending rearwardly from said central passage to said spring valve element and said piston has a reduced-in-diameter closed end which is sized and adapted to be received in said short cylindrical passageway.

27. The trigger sprayer of claim 16 wherein said valve body has a partially conical front wall surface and said piston has a seal lip having a partially conical inwardly facing surface, said seal lip being sized to be received within the space defined between said partially conical front wall surface of said valve body and the wall surface of said cylinder.

28. The trigger sprayer of claim 16 wherein a space is provided in said sprayer body behind said rear end of said valve body containing said spring valve element, said space being in communication with an annular area around said liquid inlet means, said annular area being in communication with a vent port that extends from said annular area through a wall of said sprayer body to said cylinder at a location that is forward and outward of said piston when said piston is at the end of its inner stroke into said cylinder whereby ambient air can pass through said cylinder through said vent port and into said annular area and from there into a container to which the trigger sprayer is connected for relieving the vacuum pressure created when liquid is withdrawn from said container and, at the same time, into said space behind said rear end of said valve body thereby exposing said back side of said spring valve element to the pressure of the ambient atmosphere thereby facilitating a quick return of said spring valve element to its valve closed position when said piston beings its outer return outer stroke to its at rest position.

29. The trigger sprayer of claim 16 wherein said inner end of said axial passage means is defined by a generally cylindrical wall surface in said valve body and said precompression valve assembly further includes seal lip means associated with said valve body at the inner end of said generally cylindrical wall surface for engaging and sealing against said spring valve element.

30. The trigger sprayer of claim 1 wherein said spring valve element has a thickness between approximately 0.01 and 1.00 millimeters.

31. The trigger sprayer of claim 1 wherein said spring valve element is made of plastic.

32. The trigger sprayer of claim 1 wherein said spring valve element is made of stainless steel.

33. A trigger sprayer comprising: a body having a cylinder therein; liquid inlet means in communication with said cylinder; an outlet waterway in communication with said cylinder; outlet nozzle means including a nozzle which has an outlet orifice and which is movable to and from a position in communication with said outlet waterway; a piston having an inner end and an outer end and being received in said cylinder; a fluid path including at least a part of said cylinder and said waterway and extending between said piston and said outlet orifice; a trigger operatively coupled to said body and acting on said outer end of said piston; precompression valve means in said fluid path between said piston and said outlet orifice; said precompression valve means being operable to allow liquid in a first part of said fluid path to reach said outlet orifice only after a predetermined pressure is established in said cylinder and to stop liquid from reaching said outlet orifice when the pressure in said cylinder falls below said predetermined pressure; said precompression valve means comprising a valve seat in said fluid path, a spring valve element in said fluid path and retaining means in said fluid path for retaining said spring valve element against said valve seat, whereby, when pressure is built up in said first part of said fluid path upon movement of said piston into said cylinder, said spring valve element is caused to flex allowing liquid under pressure to escape past said spring valve element into a second part of said fluid path and out said outlet orifice in said nozzle; and, biasing means for biasing said piston away from said precompression valve means.

34. The trigger sprayer of claim 33 wherein said spring valve element is made of plastic.

35. The trigger sprayer of claim 33 wherein said spring valve element is made of stainless steel.

36. The trigger sprayer of claim 33 wherein said valve element has a dome shape with a convex side defining a valve seating surface which seats against said valve seat.

37. The trigger sprayer of claim 36 wherein the dome of said dome shaped spring valve element has a radius of curvature between approximately five (5) millimeters and one hundred (100) millimeters.

38. The trigger sprayer of claim 33 wherein said spring valve element has a thickness between approximately 0.01 and 1.00 millimeters.

* * * * *